US009300986B2

(12) United States Patent
Walker et al.

(10) Patent No.: US 9,300,986 B2
(45) Date of Patent: Mar. 29, 2016

(54) MEDIA SYSTEM WITH CANONICAL ARCHITECTURE FOR INTEGRATING MEDIA PRODUCTIONS FROM DIFFERENT CONTENT PROVIDERS

(71) Applicant: Apple Inc., Cupertino, CA (US)

(72) Inventors: Michael H. Walker, Seattle, WA (US); Ricardo D. Cortes, Los Gatos, CA (US); Ashish Agarwal, Sunnyvale, CA (US); Ashish Sharma, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/212,844

(22) Filed: Mar. 14, 2014

(65) Prior Publication Data
US 2014/0282796 A1 Sep. 18, 2014

Related U.S. Application Data

(60) Provisional application No. 61/794,454, filed on Mar. 15, 2013.

(51) Int. Cl.
H04N 21/462 (2011.01)
H04N 21/44 (2011.01)
H04N 21/61 (2011.01)
H04N 21/854 (2011.01)
H04N 21/231 (2011.01)
H04N 21/232 (2011.01)
H04N 21/433 (2011.01)
(Continued)

(52) U.S. Cl.
CPC ..... H04N 21/23109 (2013.01); H04N 21/2323 (2013.01); H04N 21/4332 (2013.01); H04N 21/44016 (2013.01); H04N 21/4622 (2013.01); H04N 21/854 (2013.01); H04N 21/6175 (2013.01)

(58) Field of Classification Search
CPC ..... H04N 21/462; H04N 21/61; H04N 21/44; H04N 21/4622; H04N 21/6175; H04N 21/44016; H04N 21/23109; H04N 21/2323; H04N 21/4332
USPC .............. 725/45, 34; 707/802, 810, 755, 756, 707/673
See application file for complete search history.

(56) References Cited

U.S. PATENT DOCUMENTS 8,185,513 B2   5/2012   Wang et al.
8,316,396 B2   11/2012  Kulick et al.
(Continued)

FOREIGN PATENT DOCUMENTS

EP        1732253 A3    8/2012

Primary Examiner — Ricky Chin
Assistant Examiner — Susan X Li
(74) Attorney, Agent, or Firm — Rory D. Rankin; Meyertons, Hood, Kivlin, Kowert & Goetzel, P.C.

(57) ABSTRACT

A system and method for integrating media productions imported from a plurality of content provider systems are described. The system and method may communicate with a plurality of content provider systems to import a set of media productions from each content provider system and may normalize each media production into a normalized media document format. The media productions may be matched to each other based on the normalized media documents. The system and method may also create and store a plurality of canonical objects based on the matches determined for the media productions. For example, if a given media production matches one or more other media productions then all of the matching media productions may be linked together by a canonical object, e.g., so that the canonical object functions as an abstract representation of all of the matching media productions.

23 Claims, 16 Drawing Sheets

(56) References Cited

U.S. PATENT DOCUMENTS

| | | | |
|---|---|---|---|
| 2007/0136325 A1* | 6/2007 | Chan et al. | 707/100 |
| 2007/0156719 A1* | 7/2007 | Upendran et al. | 707/100 |
| 2007/0211158 A1* | 9/2007 | Icho | 348/333.02 |
| 2007/0226242 A1* | 9/2007 | Wang et al. | 707/102 |
| 2010/0115554 A1 | 5/2010 | Drouet et al. | |
| 2012/0159549 A1 | 6/2012 | Douillet et al. | |
| 2012/0233640 A1* | 9/2012 | Odryna et al. | 725/45 |
| 2014/0101281 A1* | 4/2014 | Jacoby et al. | 709/217 |

\* cited by examiner

Example

| id | title | source | sourceId | lastModified | isDeleted |
|---|---|---|---|---|---|
| 1 | Finding Nemo | CP-A | 564492079 | 01/01/2013 | FALSE |
| 2 | Finding Nemo (For blind viewers) | CP-A | 252295077 | 01/01/2013 | FALSE |
| 3 | Finding Nemo | CP-B | 1001 | 01/01/2013 | FALSE |
| 4 | Titanic released in 1997 | CP-A | 545892907 | 01/01/2013 | FALSE |
| 5 | Titanic release in 1997 | CP-C | tms2001 | 01/01/2013 | FALSE |
| 6 | Old Titanic from 1953 | CP-A | 301950798 | 01/02/2013 | FALSE |

Normalized Document Table

On 1/20/2013

| id | source | title | actors | directors | release year | runtime | rating | language | created |
|---|---|---|---|---|---|---|---|---|---|
| 101 | CP-A | Finding Nemo | Albert Brooks, Ellen DeGeneres | Andrew Stanton | 2003 | 101.51 | G | English | 20/01/2013 |

On 1/21/2013

| id | source | title | actors | directors | release year | runtime | rating | language | created |
|---|---|---|---|---|---|---|---|---|---|
| 101 | CP-A | Finding Nemo | Albert Brooks, Ellen DeGeneres | Andrew Stanton | 2003 | 101.51 | G | English | 20/01/2013 |
| 206 | CP-A | Finding Nemo (For blind viewers) | Albert Brooks, Ellen DeGeneres, Willem Dafoe | Andrew Stanton | 2003 | 100.53 | G | English | 21/01/2013 |

Inserted →

Mapping Table

| mapId | source Id | First Provider | target Id | Second Provider | score | pending verification | is related | Related Info |
|---|---|---|---|---|---|---|---|---|
| 9001 | 206 | CP-A | 101 | CP-A | 100 | 0 | 1 | Title: {206, iTunes} (for Blind Viewers) |

Added new Mapping →

*FIG. 9*

Normalized Document Table

On 1/22/2013

| id | source | title | actors | directors | release year | runtime | rating | language | created |
|---|---|---|---|---|---|---|---|---|---|
| 101 | CP-A | Find Nemo | Albert Brooks, Ellen DeGeneres | Andrew Stanton | 2003 | 101.51 | G | English | 22/01/2013 |
| 206 | CP-A | Finding Nemo (For blind viewers) | Albert Brooks, Ellen DeGeneres, Willem | Andrew Stanton | 2003 | 100.53 | G | English | 21/01/2013 |
| 311 | CP-B | Find Nemo | Albert Brooks, Ellen DeGeneres | Andrew Stanton | 2003 | 101.51 | G | English | 22/01/2013 |

Updated → (row 101)
Inserted → (row 311)

Mapping

| mapId | source Id | source Provider | target Id | target Provider | score | pending verification | is related | Related Info | is Deleted | Delete Info |
|---|---|---|---|---|---|---|---|---|---|---|
| 9001 | 206 | CP-A | 101 | CP-A | 100 | 0 | 1 | Title: {206,iTunes} (for Blind) | 1 | {cause="Title Updated, obsolete} |
| 9002 | 101 | CP-A | 311 | CP-B | 100 | 0 | 0 | - | 0 | - |

Marked Deleted → (row 9001)
Added new Mapping → (row 9002)

FIG. 10

Normalized Document Table

| id | title | source | sourceId | lastModified | isDeleted |
|---|---|---|---|---|---|
| 1 | Finding Nemo | CP-A | 564492079 | 01/01/2013 | FALSE |
| 2 | Finding Nemo (For blind viewers, audio description, DVS) | CP-A | 255295077 | 01/01/2013 | FALSE |
| 3 | Finding Nemo | CP-B | 1001 | 01/01/2013 | FALSE |
| 4 | Titanic released in 1997 | CP-A | 545892907 | 01/01/2013 | FALSE |
| 5 | Titanic release in 1997 | CP-C | tms2001 | 01/01/2013 | FALSE |
| 6 | Old Titanic from 1953 | CP-A | 301950798 | 01/02/2013 | FALSE |

Mappings Table

| mapId | fromId | ToId | score |
|---|---|---|---|
| 9001 | 1 | 2 | 100 |
| 9002 | 1 | 3 | 90 |
| 9003 | 2 | 3 | 90 |
| 9004 | 4 | 5 | 80 |

Canonical Object Table

| cid | name | releaseYear | version | contentStatus |
|---|---|---|---|---|
| 5001 | Finding Nemo | 2003 | 1 | Polished |
| 5002 | Titanic | 1997 | 1 | Polished |
| 5003 | Old Titanic | 1953 | 1 | Polished |

Canonical Version Table

| id | cid | sourceType | sourceId | mapId | version |
|---|---|---|---|---|---|
| 1 | 5001 | CP-A | 564492079 | | SD |
| 2 | 5001 | CP-A | 255295077 | 9001 | Blind Viewers, DVS |
| 3 | 5001 | CP-B | 1001 | 9002 | SD |
| 4 | 5002 | CP-A | 545892907 | 9003 | HD |
| 5 | 5002 | CP-C | tms2001 | 9004 | SD |
| 6 | 5003 | CP-A | 301950798 | | SD |

FIG. 11

*Normalized Document*

| id | source | sourceId | title | lastModified | isDeleted |
|---|---|---|---|---|---|
| 1 | CP-A | 564492079 | Finding Nemo | 01/01/2013 | FALSE |
| 2 | CP-A | 255295077 | Finding Nemo (For blind viewers, audio description, DVS) | 01/01/2013 | FALSE |
| 3 | CP-B | 1001 | Finding Nemo | 01/04/2013 | FALSE |

*Mappings*

| mapId | fromId | ToId | score | isDeleted |
|---|---|---|---|---|
| 9001 | 1 | 2 | 100 | 0 |
| 9002 | 1 | 3 | 90 | 0 |
| 9003 | 2 | 3 | 90 | 1 |

*Canonical Version*

| id | cid | sourceType | sourceId | mapId | version | deleted |
|---|---|---|---|---|---|---|
| 1 | 5001 | CP-A | 564492079 | 9001 | SD | 0 |
| 2 | 5001 | CP-A | 255295077 | 9002 | Blind Viewers, DVS | 0 |
| 3 | 5001 | CP-B | 1001 | 9003 | SD | 1 |
| 4 | 5002 | CP-B | 1001 | | SD | 0 |

*Canonical Object*

| cid | name | releaseYear | version |
|---|---|---|---|
| 5001 | Finding Nemo | 2003 | 1 |
| 5002 | Finding Nemo | 2003 | 1 |

Normalized Document

| id | title | source | sourceId | lastModified | isDeleted |
|----|-------|--------|----------|--------------|-----------|
| 1 | Finding Nemo | CP-A | 564492079 | 01/04/2013 | FALSE |
| 2 | Finding Nemo (For blind viewers, audio description, DVS) | CP-A | 255295077 | 01/01/2013 | FALSE |
| 3 | Finding Nemo | CP-B | 1001 | 01/01/2013 | FALSE |
| 4 | Titanic released in 1997 | CP-A | 545892907 | 01/01/2013 | FALSE |
| 5 | Titanic release in 1997 | CP-C | tms2001 | 01/01/2013 | FALSE |
| 6 | Old Titanic from 1953 | CP-A | 301950798 | 01/01/2013 | FALSE |

Mappings

| mapId | fromId | ToId | score |
|-------|--------|------|-------|
| 9001 | 1 | 2 | 100 |
| 9002 | 1 | 3 | 90 |
| 9003 | 2 | 3 | 90 |
| 9004 | 4 | 5 | 80 |
| 9005 | 4 | 6 | 90 |

Canonical Object

| cid | name | releaseYear | version |
|-----|------|-------------|---------|
| 5001 | Finding Nemo | 2003 | 1 |
| 5002 | Titanic | 1997 | 1 |
| 5003 | Old Titanic | 1953 | 1 |

Canonical Version

| id | cid | sourceType | sourceId | mapId | version | deleted |
|----|-----|------------|----------|-------|---------|---------|
| 1 | 5001 | CP-A | 564492079 | 9001 | SD | 0 |
| 2 | 5001 | CP-A | 255295077 | 9002 | Blind Viewers DV | 0 |
| 3 | 5001 | CP-B | 1001 | 9003 | SD | 0 |
| 4 | 5002 | CP-A | 545892907 | 9004 | HD | 0 |
| 5 | 5002 | CP-C | tms2001 | 9004 | SD | 0 |
| 6 | 5003 | CP-A | 301950798 |  | SD | 1 |
| 7 | 5002 | CP-A | 301950798 | 9005 | SD | 0 |

MEDIA SYSTEM WITH CANONICAL ARCHITECTURE FOR INTEGRATING MEDIA PRODUCTIONS FROM DIFFERENT CONTENT PROVIDERS

CROSS-REFERENCE TO RELATED APPLICATIONS

This application claims the benefit of U.S. Provisional Application No. 61/794,454, filed on Mar. 15, 2013, which is incorporated by reference herein in its entirety.

BACKGROUND OF THE INVENTION

1. Field of the Invention

This invention relates to the field of computer-based media systems, and more particularly, to a system and method for integrating media productions (e.g., movies, television programs, videos, etc.) that originate from different online content providers.

2. Description of the Related Art

Online media systems that stream multimedia content to users over the Internet have become very popular in recent years since they provide a convenient way for users to view content. However, the very popularity of such media systems means that there are now a large number of media content providers, each with their own particular interface that the user must invoke and navigate in order to find and play the desired content. It would be desirable to provide a system that can integrate the media content that is available from different content providers, e.g., to provide users or client systems with an integrated view of content across multiple content provider systems.

SUMMARY

Various embodiments of a system and method for integrating media productions imported from a plurality of content provider systems are described. According to some embodiments, the system may communicate with a plurality of content provider systems to import a set of media productions from each content provider system. The system may create a respective media document representing each of the media productions, and may match the media productions to each other based on the media documents.

In further embodiments, the system may create and store a plurality of canonical objects based on the matches determined for the media productions. For example, if a given media production matches one or more other media productions then all of the matching media productions may be linked together by a canonical object, e.g., so that the canonical object functions as an abstract representation of all of the matching media productions. In some embodiments, if the system did not determine any matches between a given media production and any other media production then a canonical object may still be created to represent the given media production, e.g., without linking it to any other media production.

In some embodiments the media documents created by the system to represent the media productions may be "normalized" media documents. The media document for a given media production is referred to as being a "normalized" media document if its format is independent of the particular content provider system from which the media production was obtained. For example, regardless of the particular content provider system from which a given movie production originates, the normalized media document for the movie may include metadata describing the movie, such as its title, director, actors, release year, rating, etc. The normalized media documents created for all the movie productions obtained from all the content provider systems may have the same (normalized) information fields and format. Normalizing the media productions into normalized media documents having a common format across all the content provider systems may abstract the information of the media productions away from the particular data representations used by the various content provider systems and enable media productions from different content provider systems to be treated identically regardless of which content provider systems they originate from.

Since the original media productions obtained from the content provider systems may be stored in different formats, the system may implement a different normalization module for each content provider system. The normalization module for each content provider system may be configured to analyze the particular format of the media productions obtained from the content provider system in order to extract the necessary information to create the normalized media documents.

In further embodiments, the system may provide an application programming interface (API) that includes a set of functions that enable client modules to query the system to obtain information regarding the canonical objects and/or the normalized media documents. For example, the API may include a function configured to provide the IDs of all the canonical objects maintained by the system, another function to accept the ID of a given canonical object as an input parameter and return information indicating all of the media productions linked together by the canonical object, etc.

In some embodiments an indexer may utilize the API to create an index based on the canonical objects. For example, the index may be useable by a client device of an end user to display a user interface in which the matching media productions linked together by the canonical objects are grouped together. As one example, if a given canonical object links together two or more instances of the same movie from different content provider system, the user interface may first display a single canonical representation of the movies, and the user may then select the canonical representation to see further details, such as the individual instances of the matching movies.

BRIEF DESCRIPTION OF THE DRAWINGS

A better understanding of the invention can be obtained when the following detailed description is considered in conjunction with the following drawings, in which:

FIG. 9 illustrates an example of adding a new normalized media document and mapping;

FIG. 10 illustrates an example of updating a new normalized media document and adding a new normalized media document;

FIG. 11 illustrates an example of a mapping table created from a set of normalized media documents and canonical objects created from the mapping table;

FIG. 14 illustrates an example of a split operation performed when updating canonical objects;

FIG. 15 illustrates an example of a merge operation performed when updating canonical objects;

Figure 1:
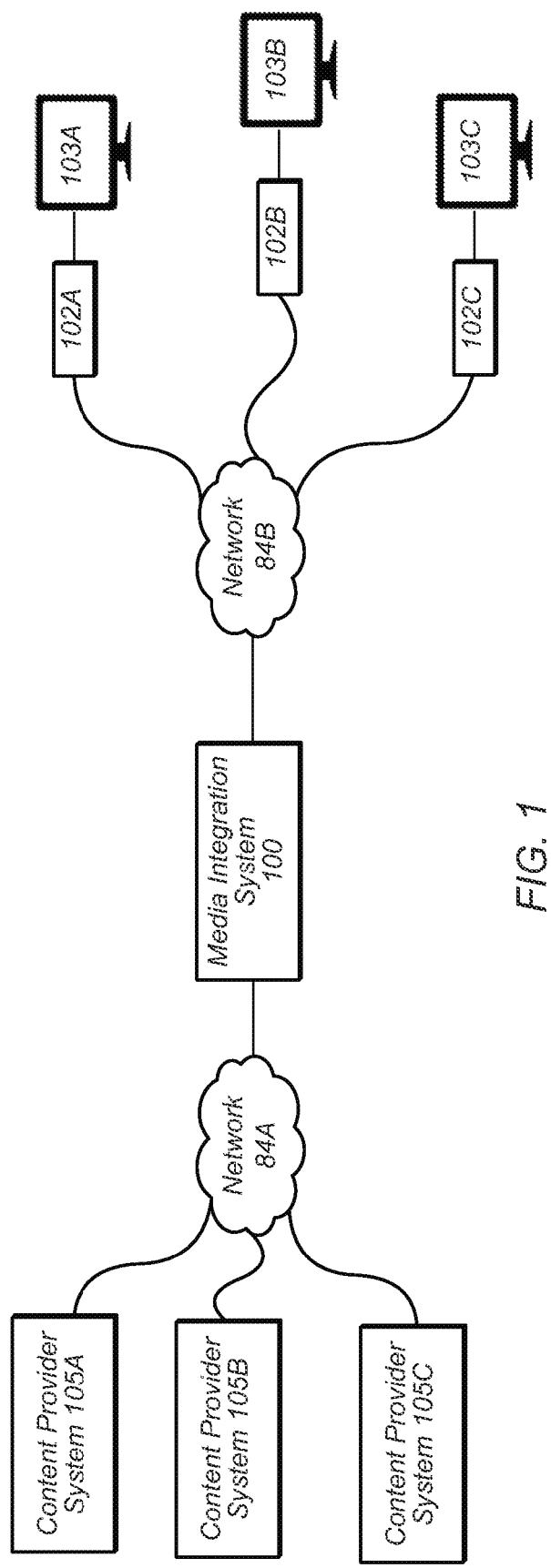
FIG. 1 illustrates one embodiment of a system including a media integration system configured to integrate media content that originates from different content provider systems.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a system including a media integration system 100 configured to integrate media content that originates from different content provider systems 105A-105C. Each content provider system may be managed by or associated with a particular media company or other organization that provides media content for online viewing or consumption. Each piece of media content from a given content provider system is referred to herein as a "media production." Examples of media productions that may be provided by the content provider systems include various kinds of movies and films, television programs, music videos, albums/songs, etc. In general, a given media production provided by a given content provider system may include any kind of content that includes video and/or audio information. Also, each content provider system may be managed by or affiliated with any kind of company or organization, such as cable or satellite television providers, television networks or channels, movie studios, sporting leagues, news organizations, music labels, online media services, etc.

The media integration system 100 may be configured to import the media productions from the content provider systems, e.g., via a network 84A. For example, each content provider system may include one or more computer servers with which one or more computer servers in the media integration system 100 communicate in order to cause the media productions to be transmitted over the network 84A to the media integration system 100.

In some embodiments the media integration system 100 may be configured to provide the media productions obtained from the content provider systems to various end users or households. For example, each end user may have a client device 102 configured to receive the media productions and display or play them, e.g., on a display device or other media device. For example, in some embodiments a given client device may be coupled to (or may be included in) a television device 103. In other embodiments a given client device may be coupled to or included in any of various other kinds of devices able to display or play media productions, such as a set-top box, smart phone, home media hub, tablet computer, wearable receiving device (e.g., watch or glasses), etc. The media integration system 100 may communicate with the client devices via a network 84B in order to deliver the media productions to the end users.

Referring again to FIG. 1, in various embodiments the media integration system 100 may be configured to import media productions from any number of content provider systems 105 and deliver the media productions to any number of client devices 102. Also, the networks 84A and 84B may include any type of network or combination of networks. For example, the networks may include any type or combination of local area network (LAN), a wide area network (WAN), wireless networks, an Intranet, the Internet, storage area network (SAN), etc. Examples of local area networks include Ethernet networks, Fiber Distributed Data Interface (FDDI) networks, and token ring networks. Also, each system or device may be coupled to the network(s) using any type of wired or wireless connection medium. For example, wired mediums may include Ethernet, fiber channel, a modem, etc. Wireless connection mediums may include a wireless connection using a wireless communication protocol such as IEEE 802.11 (wireless Ethernet), a modem link through a cellular service, a satellite link, etc.

There may be considerable overlap among the media productions that the media integration system 100 obtains from the various content providers. For example, multiple content providers may offer the same movie or television program. Rather than treating corresponding media productions from different content providers as being independent of each other, the media integration system 100 may be configured to determine which media productions match each other, and may group together the matching media productions in various ways. This may be useful, for example, in order to be able to provide the client devices with indices in which matching media productions from different content providers are grouped together, e.g., so that the client devices can display a user interface that integrates corresponding media productions from different providers. For example, when displaying a user interface for browsing for movies, it may be desirable from a client device to display a single listing for each movie. If the movie is available from multiple content providers, the user can then "drill down" into that listing to see the individual movies from each of the content providers.

Figure 2:
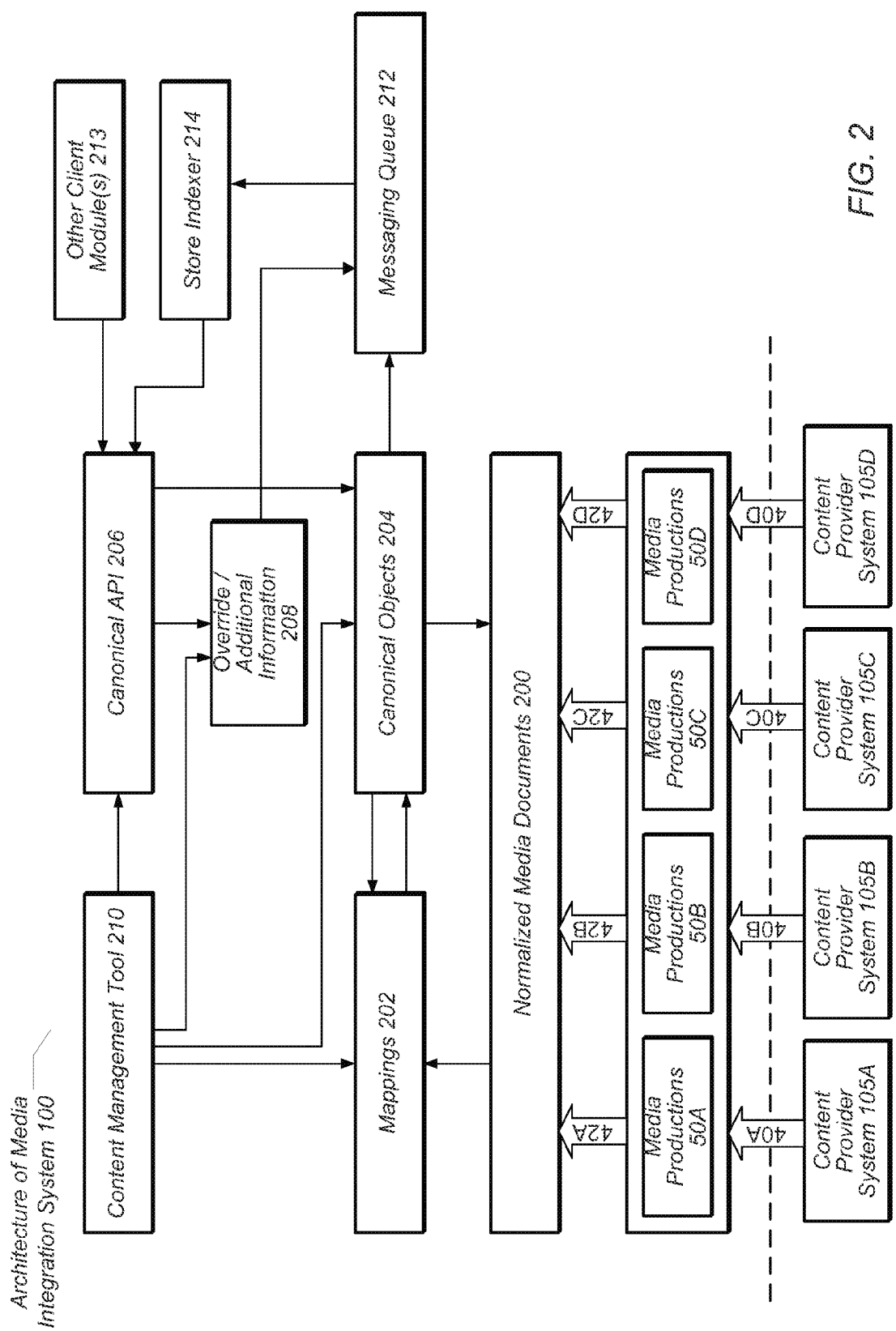
FIG. 2 illustrates a logical architecture of the media integration system according to one embodiment.

FIG. 2 illustrates a logical architecture of the media integration system 100 according to one embodiment. The architecture shown in FIG. 2 may facilitate the integration of media productions from different content providers, e.g., by enabling the media integration system to match corresponding media productions and group matching sets of media productions together into a single canonical object. The architecture diagram of FIG. 2 will be described concurrently with several flowcharts describing methods performed by the media integration system 100. It is noted that the flowcharts are intended to illustrate a representative embodiment, and in other embodiments the methods may be implemented differently than shown in the flowcharts.

Figure 3:
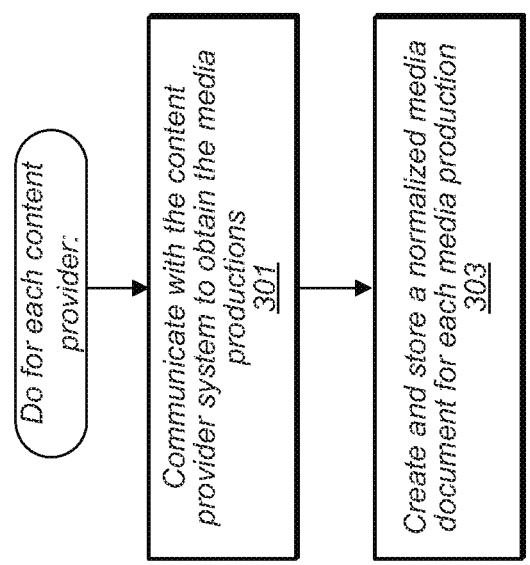
FIG. 3 is a flowchart diagram illustrating one embodiment of a method performed by the media integration system for importing media productions from different content provider system and creating normalized media documents representing the media productions.

FIG. 3 is a flowchart diagram illustrating one aspect of the operation of the media integration system. In block 301, the media integration system 100 may communicate with a particular content provider system to obtain or import a set of media productions from the content provider system. This may be performed for each content provider system with which the media integration system 100 is configured to operate. For example, FIG. 2 illustrates a set of media productions 50A obtained from the content provider system 105A, another set of media productions 50B obtained from the content provider system 105B, etc. Obtaining the media productions from a given content provider system may include communicating with the content provider system via a network to receive data representing each media production, and storing the data for each media production on one or more storage devices in the media integration system 100. The data for each media production may include the actual content of the media production (e.g., the video, audio, and/or other content information) as well as metadata describing the media production.

The media integration system 100 may utilize different techniques to import the media productions from different content provider systems. In various embodiments the media integration system 100 may communicate with each content provider system using any of various kinds of communication models or software interfaces in order to discover and import the media productions. Since the content provider systems may be maintained by third parties or companies different than the organization which maintains the media integration system 100, each content provider system may be implemented differently. Thus, the media integration system 100 may use whichever communication techniques are most appropriate for each content provider system. For example, the media integration system may use a push-based technique to import the media productions from one content provider system (e.g., such that the content provider system uses push notifications to notify the media integration system when new/updated media productions are available), whereas the media integration system may use a pull-based technique to import the media productions from another content provider system (e.g., such that the media integration system periodically queries the content provider system to determine whether new/updated media productions are available). As another example, the media integration system 100 may use a hypertext transfer protocol (HTTP)-based interface to communicate with one content provider system via uniform resource locators (URLs), and may use a file transfer protocol (FTP) or other type of communication protocol to communicate with another content provider system.

In some embodiments the media integration system 100 may include a respective import module configured to communicate with each content provider system in order to import the media productions from that content provider system. For example, as illustrated in FIG. 2, an import module 40A may communicate with the content provider system 105A to import the media productions 50A, an import module 40B may communicate with the content provider system 105B to import the media productions 50B, etc.

Different content provider systems may provide their media productions in different formats. For example, one content provider system may deliver a given media production in a single file that includes all the content and metadata for the media production, whereas another content provider system may deliver a given media production as a plurality of separate files. Each import module may initially store the media productions obtained from its respective content provider system in whichever format the content provider system delivers them. Each media production may be stored on one or more storage devices in the media integration system 100, e.g., in the form of one or more files or database entries.

After importing the media productions from the content provider systems, the media integration system 100 may next create and store a normalized media document representing each media production. A "media document" may refer to any data structure, object, or portion of stored information that describes or represents the corresponding media production. The media document for a given media production is referred to as being a "normalized" media document because its format is independent of the particular content provider system from which the media production was obtained. For example, regardless of the particular content provider system from which a given movie originates, the normalized media document for the movie may include metadata describing the movie, such as its title, director, actors, release year, rating, etc. The normalized media documents for all the movies obtained from all the content provider systems may have the same information fields and format. For example, in some embodiments the normalized media document for each movie could be stored as a row in a relational database, where the row includes a column for the movie's title, another column for the movie's director, etc.

As discussed above, the media production information originally obtained by the media integration system 100 may be stored in different formats for different content provider systems. Normalizing the media productions into normalized media documents having a common format across all the content provider systems may abstract the information of the media productions away from the particular data representations used by the various content provider systems and enable media productions from different content provider systems to be treated identically regardless of which content provider systems they originate from.

Since the original media productions obtained from the content provider systems may be stored in different formats, the media integration system 100 may implement a different normalization module for each content provider system. The normalization module for each content provider system may be configured to analyze the particular format of the media productions obtained from the content provider system in order to extract the necessary information to create the normalized media documents. For example, FIG. 2 illustrates a normalization module 42A that analyzes the media productions 50A obtained from the content provider system 105A and creates a respective normalized document for each one, a normalization module 42B that analyzes the media productions 50B obtained from the content provider system 105B and creates a respective normalized document for each one, etc.

For a given type of media production, the normalized media document created for the media production may be in the same format regardless of which normalization module creates the normalized media document. However, different types of media productions may use different types of normalized media documents. For example, as described above, the normalized media document for a movie may include information such as the movie's title, director, actors, release year, rating, etc. On the other hand, the normalized media document for a music album may include different information. In general, the normalized media document for a given type of media production may include any of various information fields that describe that type of media production and enable particular media productions of that type to be matched to each other. In addition, a normalized media document may also include other information fields that the media integration system 100 uses to manage the media productions. For example, in some embodiments each normalized media document may include management information such as: an "is deleted" Boolean field indicating whether the corresponding media production has been deleted from the system; a "last updated" field to indicate the most recent time when updated information for the media production was received from the content provider system; etc. Each normalized media document may also include a pointer, link, ID, or other information that identifies the original media production to which the normalized media document corresponds.

In some embodiments each normalized media document may include metadata about the corresponding media production as well as other metadata used for managing the normalized media document, but may not include the audio/video data that implements the actual audio/video content of the media production. Instead, each normalized media document may include a pointer, ID, or other information that references the original audio/video data imported from the content provider system (or references a media production object imported from the content provider system, where the media production object may in turn reference or include the original audio/video data). Thus for example, in some embodiments, when delivering a particular media production to a client device, the media integration system may deliver the original audio/video data imported for that media production from the respective content provider. In other embodiments the media integration system 100 may convert the audio/video data for some of the media productions into a different format, if desired. In various embodiments the original or converted audio/video data for a given media production may be in any digital format or may use any kind of encoding. Examples of video formats and encoding schemes include MPEG (Moving Picture Experts Group)-1, MPEG-2, MPEG-3, MPEG-4, Audio Video Standard (AVS), Advanced Audio Coding (AAC), etc.

In other embodiments, the media integration system 100 may not import the actual audio/video data of the media productions from the content provider systems. For example, the media integration system 100 may import the metadata about the media productions and create a normalized media document for each one based on the metadata, which allows the media integration system to match the media productions to each other and create canonical objects representing matching sets of media productions, as described in detail below. In some embodiments, if a client device with which the media integration system 100 communicates requests the audio/video content of a particular media production, the media integration system 100 may in some embodiments redirect the client device to the specific content provider system from which the media production originated in order to retrieve the audio/video content from the content provider system.

While the operation of the import modules and normalization modules may be specific to the particular content provider systems, most of the rest of the operation of the media integration system 100 may be abstracted away from the particular content provider systems. Once the normalized media documents for the media productions have been created, the media integration system 100 may treat all the normalized media documents alike, regardless of which particular content provider systems they are associated with. This may enable new content provider systems to be integrated with the media integration system 100 fairly easily and quickly without requiring extensive modifications to be performed. For example, adding a new content provider system may mainly be a matter of implementing a new import module and normalization module for the new content provider system, and the rest of the media integration system may not need to be changed.

Once the normalized media documents have been created, a mapping module may then perform a matching algorithm that analyzes the normalized media documents to determine which media productions match each other. A match between two media productions may indicate that the media productions should be grouped together by the media integration system 100 and/or should be treated as being instances of the same underlying media production. For example, multiple content provider systems may each transmit the same movie to the media integration system 100, in which case the media integration system 100 may match them together and treat them as instances of the same movie. As another example, the content provider systems may transmit movies, movie trailers, and movie reviews to the media integration system 100. The media integration system 100 may compare the normalized documents to determine which movie reviews and trailers match which movies, e.g., so that the reviews and trailers for a certain movie can be linked to the movie itself.

Figure 4:
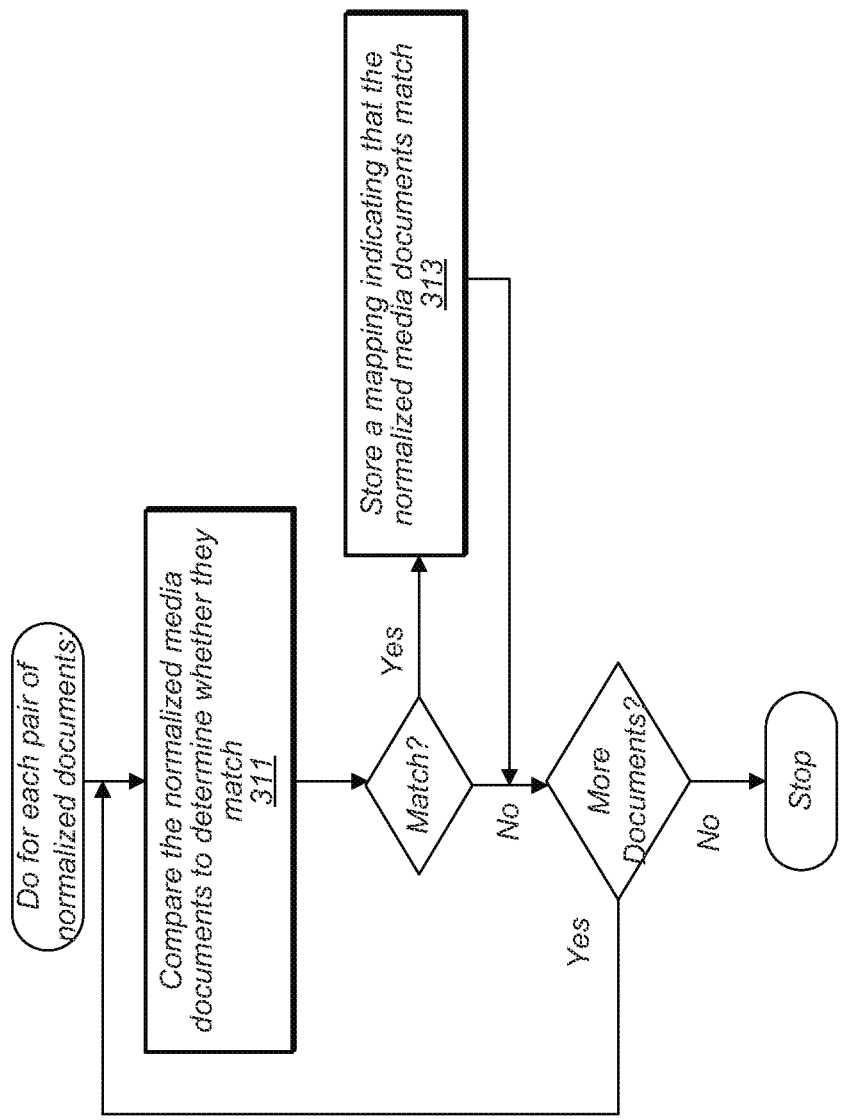
FIG. 4 is a flowchart diagram illustrating one embodiment of a method performed by a mapping module implemented by the media integration system.

FIG. 4 is a flowchart diagram illustrating one embodiment of a method performed by a mapping module implemented by the media integration system 100. For each pair of normalized media documents, the mapping module may compare the normalized media documents to determine whether they match. In various embodiments the mapping module may compare the information in the normalized media documents using various algorithms or heuristics to determine whether they match each other. In some embodiments certain information fields may be given more weight than others. For example, in some embodiments, when comparing the normalized media documents for two movies, the mapping module may require that the titles be the same in order for them to be considered a match, but may not require the release dates to be the same since the release date information for the same movie can often different between different content provider systems.

In some embodiments the media integration system 100 may implement a different mapping module for each type of media production, e.g., a mapping module for movies, another mapping module for television programs, etc. Each mapping module may perform an appropriate algorithm for the particular type of media production. Thus, the mapping module for each type of media production may perform an appropriate matching algorithm or heuristic for that type of media production.

As indicated in block 313, if the mapping module determines a match between two normalized media documents, the mapping module may store a mapping indicating that they matched. The mapping may include information specifying the two normalized media documents (e.g., specifying an ID of each one) that matched. In some embodiments the mapping information may also specify a score or confidence level indicating the level of confidence in the match. Matches that have low scores may be flagged for review by a human administrator to verify that they should actually be considered as matches.

FIG. 2 illustrates a set of mappings 202 generated by one or more mapping modules based on the normalized media documents. Once the mappings have been generated, a canonicalization module may create a plurality of canonical objects 204 based on the mappings 202. Each canonical object is an object, data structure, or portion of stored information that represents one or more normalized media documents. If a set of normalized media documents were determined by the mapping module to match each other then a canonical object may be created to represent or group together all of the matching normalized media documents. For example, suppose that the mapping module determined that the respective normalized media documents for a first movie from a first content provider system, a second movie from a second content provider system, and a movie trailer from a third content provider system all matched each other. In this case, the canonicalization module may create a single canonical object that links together all three of these normalized media documents. If a given normalized media document was determined by the mapping module to not match any other normalized media document then the canonicalization module may still create a canonical object for the normalized media document, but it may only represent that single normalized media document without linking it to any others. For convenience, the set of normalized media documents represented by a respective canonical object are said to be "included in" the canonical object.

Figure 5:
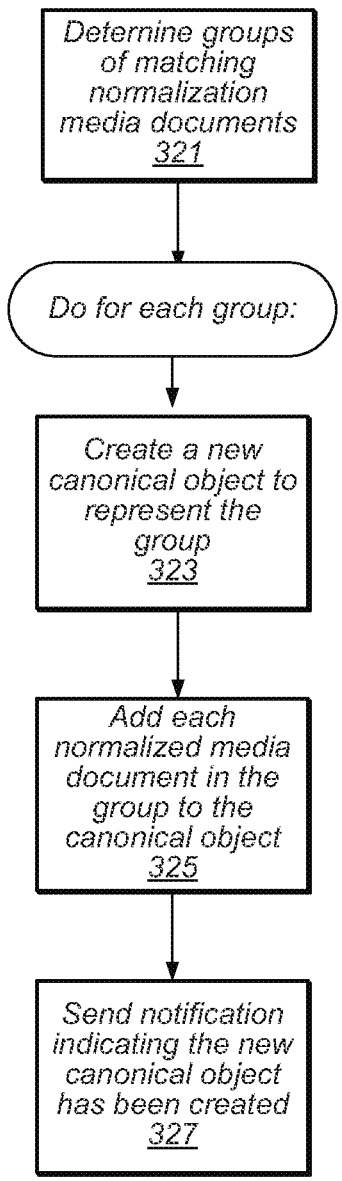
FIG. 5 is a flowchart diagram illustrating one embodiment of a method performed by a canonicalization module to create canonical objects based on mappings determined by the mapping module.

FIG. 2 illustrates a set of canonical objects 204 created by the canonicalization module, and FIG. 5 is a flowchart diagram illustrating one embodiment of a method performed by the canonicalization module to create the canonical objects 204. As indicated in block 321, the canonicalization module may determine groups of matching normalized media documents based on the mappings 202 created by the mapping module. For example, if the mapping module stored a first mapping between normalized media document A and normalized media document B, a second mapping between normalized media document A and normalized media document C, and a third mapping between normalized media document B and normalized media document C, then the canonicalization module may determine that all of these three normalized media documents are in a single group. As another example, if there is no mapping stored for a normalized media document D then the canonicalization module may determine that the normalized media document D is in another group that has only that single normalized media document D.

For each group, the canonicalization module may create a new canonical object to represent the group (block 323), and may add each of the normalized media documents in the group to the canonical object (block 325). In some embodiments the canonicalization module may also send a notification message to one or more other modules in the media integration system 100 to inform them that the new canonical object has been created (block 327), e.g., so that they can take appropriate actions in response. For example, FIG. 2 illustrates a messaging queue 212 in which the notification message may be stored. A store indexer 214 or other client module(s) 213 may receive the notification from the messaging queue 214 and query a canonical API (application programming interface) 206 in order to determine information regarding the new canonical object that was added to the system. The store indexer 214 may be configured to build indices which are exposed to the client devices 102 or other systems external to the media integration system 100, e.g., where the indices use the groupings specified by the canonical objects to logically group together different media productions. Thus, the store indexer 214 may update one or more of its indices to add the new group of media productions represented by the new canonical object.

In addition to storing information for each canonical object that specifies the set of normalized media documents represented by the canonical object, the media integration system 100 may also store other information in association with the canonical object that applies to all of the normalized media documents in the set. This additional information is illustrated in FIG. 2 as the override/additional information 208. For example, suppose that a given canonical object groups together a set of normalized media documents corresponding to movies from different content provider systems. Each content provider may provide its own description of the movie, but it may be desirable to use a different description for the movie that does not come from any of the content provider systems. In this case, the canonical object could include a description override field that can be filled in by the vendor of the media integration system, which may be used by the client devices when displaying the description of the movie. As another example, the media integration system 100 may be configured to present some of the media productions as being featured content for promotional purposes, and each canonical object could include a "featured content" Boolean field to indicate whether or not it is currently featured.

As illustrated in FIG. 2, the media integration system 100 may include a content management tool 210 which enables human administrators of the system to perform various management functions. For example, the content management tool 210 may enable an administrator to add various kinds of override/additional information 208 to particular canonical objects. The content management tool 210 may also enable an administrator to change or override the mappings that are automatically determined by the mapping module, e.g., if these are found to be erroneous. As another example, an administrator may use the content management tool 210 to change various information fields in a media production or normalized media document, such as the title, actors, etc. As indicated in FIG. 2, the content management tool 210 may use the canonical API 206 to lookup and edit the information in various objects stored in the system.

Figure 6:
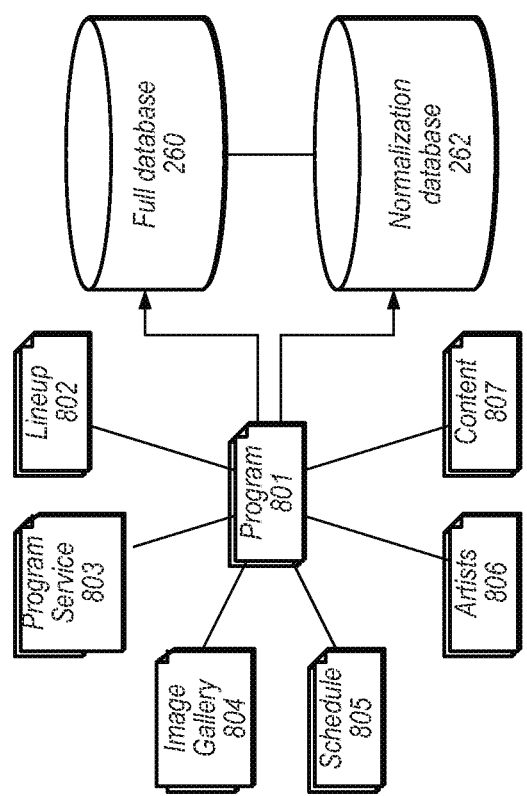
FIG. 6 illustrates an example of a media production imported from a particular content provider system.

FIG. 6 illustrates an example of a media production imported from a particular content provider system. In this case the media production is a television program 801, and the content provider system delivers the program in the form of a set of files. For example, one file may include the audio/video content 807, another may include information specifying the television channel lineup 802 for the program, another may include a gallery of images 804 representing the program, etc. The program may be imported and normalized by the import module and normalization module for the content provider system.

In some embodiments the program may be imported into multiple data stores or databases. For example, a normalized media document for the program may be created and stored in a normalization database 262. The information stored in the normalization database 262 may include only the core information fields which the mapping module needs to use to match the normalized media document to other normalized media documents. A more complete representation which includes not only the core information fields, but also additional information, may be stored in the full database 260. For example, in some embodiments the image gallery, channel lineup, schedule information, etc, which is provided by the content provider system may not be used by the mapping module, and may not be stored in the normalized media document, but this information may still be stored in the full database 260. It may be desirable to use a separate normalization database in some embodiments so as to be able to use a fast or specialized type of database that is especially well suited for performing the matching/mapping based on the core information fields, whereas another type of database may be better suited for storing the full information for the media productions.

Figures 7, 8:
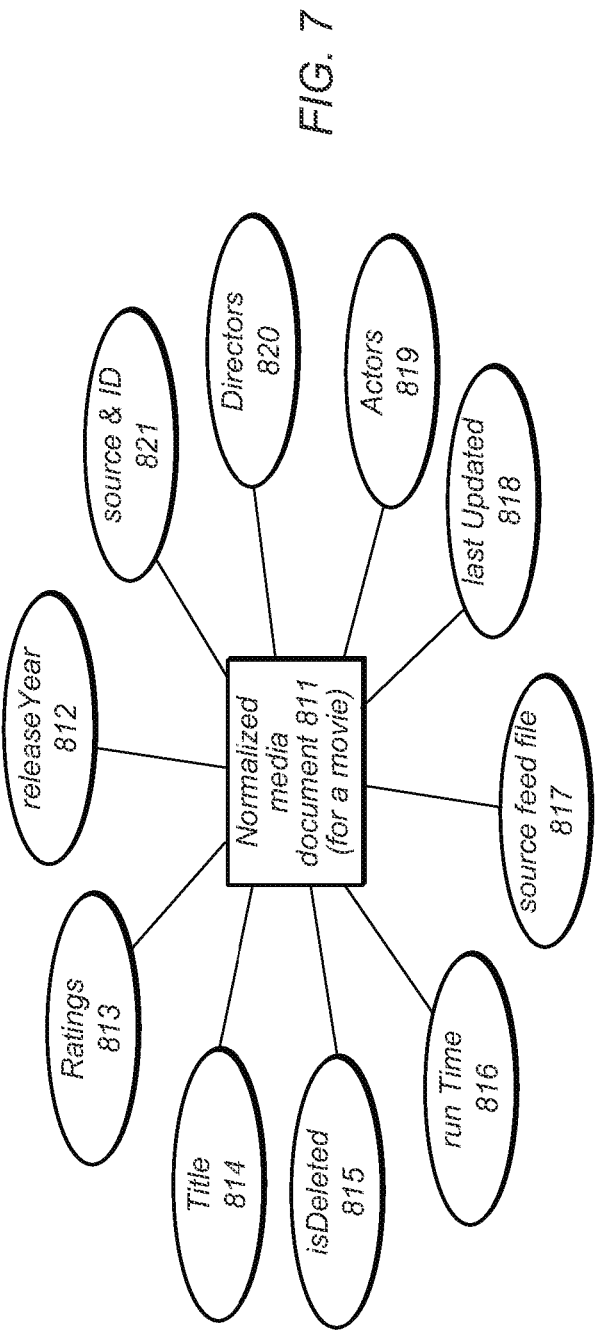
FIG. 7 illustrates an example of a normalized media document for a movie according to one embodiment.
FIG. 8 illustrates an example of a relational database table, where each row in the table represents a particular normalized media document for a movie.

FIG. 7 illustrates an example of a normalized media document 811 for a movie according to one embodiment. The normalized media document may include information such as the title 814 of the movie, rating(s) 813 of the movie, release year 812 of the movie, director(s) 820 of the movie, actor(s) 819 of the movie, run time 816 of the movie, etc. The normalized media document may also include other information that the media integration system 100 uses to manage the normalized media document 811, such as: information 821 identifying the content provider system from which the movie was obtained and the ID that the content provider system uses to identify the movie; the source feed file 817; a last updated field 818 that indicates when the movie was last updated in the media integration system 100, an "is deleted" field that indicates whether the movie is active or has been deleted from the system, etc.

FIG. 8 illustrates an example of a relational database table, where each row in the table represents a particular normalized media document for a movie. For example, the normalized media document represented by the first row has an ID of 1, a title of "Finding Nemo," a source of CP-A (e.g., content provider A), a source ID of 564492079 (e.g., where the source ID is the ID which the content provider CP-A uses to identify the movie), a last modified date of Jan. 1, 2013, and an "is Deleted" field of FALSE.

FIG. 9 illustrates two views of a normalized document table. In the first view which represents the table on the date Jan. 20, 2013, the table includes the single normalized document for a movie titled "Finding Nemo" which was obtained from a content provider system "CP-A". In the second view which represents the table on the date Jan. 21, 2013, a new row representing a normalized media document for another movie has been inserted in the table. This new movie is a different version of the movie "Finding Nemo" which is specialized for blind viewers. After the new normalized media document has been added, the mapping module may compare it to other normalized media documents in the database and may determine that it matches the first "Finding Nemo" movie which was already present. In response, the mapping module may create a new mapping between the two movies. As shown in FIG. 9, the mapping includes information specifying the IDs of the two matching normalized media documents, their content providers, a match score, etc.

FIG. 10 shows the normalized media document table on a later date of Jan. 22, 2013. The title of the movie in the first row has changed from "Finding Nemo" to "Find Nemo." For example, the content provider system CP-A may have provided updated information for this movie to correct an error, or an administrator of the media integration system 100 may have used the content management tool to correct the title. As a result, this movie is no longer considered to be a match by the mapping module, and so the mapping 9001 has been marked as deleted, and the reason for the deletion has been stored in the Delete Info field.

In addition, another movie called "Find Nemo" from a different content provider system "CP-B" has also been added to the system, as indicated by the newly inserted normalized media document 311. The mapping module has determined that the normalized media document 311 matches the normalized media document 101 and has created and stored a new mapping 9002 to indicate this match.

FIG. 11 illustrates an example of a normalized document table for movies and a mapping table that has been created based on the normalized document table. The mappings table indicates that the normalized media documents with the following IDs match each other: 1 and 2; 1 and 3; 2 and 3; 4 and 5. FIG. 11 also illustrates how canonical objects for the movies may be represented according to one embodiment. In this embodiment, each canonical object is represented as a respective row in a Canonical Object table in a relational database. The row may include an ID of the canonical object, as well as other information regarding the canonical object, such as the title of the movie, for example. Each normalized media document included in a canonical object is represented as a row in a Canonical Version table, where the row specifies information identifying the normalized media document and the canonical object. For example, the first row in the Canonical Version table indicates that the normalized media document having the ID 1 is included in the canonical object having the ID 5001. Similarly, the second and third rows indicate that the normalized media documents having the IDs 2 and 3 are also included in the canonical object having the ID 5001. Thus, the canonical object 5001 groups together or includes all three of these normalized media documents since the mappings table specifies that all three of these match each other. Each row in the canonical version table also specifies other information regarding the respective normalized media document, such as the associated content provider system and source ID.

Similarly, the canonical object 5002 groups together the normalized media documents having the IDs 4 and 5. The canonical object 5003 includes only the normalized media document having the ID 6 since this normalized media document has no mapping in the mappings table to any other normalized media document.

The media integration system 100 may periodically or occasionally receive updates from the various content provider systems. The import module(s) for the respective content provider system(s) may update the normalized media documents, which may include changing information fields within existing normalized media documents (e.g., if the information for the corresponding media production from the content provider system has changed), marking normalized media documents as deleted (e.g., if the corresponding media production has been deleted from the content provider system), or adding new normalized media documents (e.g., if new media productions have been added to the content provider system).

In response to the update, the mapping module may update the mappings for the normalized media documents which have been updated (e.g., changed, added, or marked for deletion). For example, if the title or some other information field for a given normalized media document changed then the normalized media document may no longer match one or more other normalized media documents that it previously matched, and so the mappings to these other normalized media documents may be deleted (or may be left in the mappings table but marked as deleted). If the change results in the normalized media document now matching one or more normalized media documents that it did not match before then mappings to these other normalized media documents may be added to the mappings table.

If a given normalized media document was marked as deleted by the update then all of the mappings between the normalized media document and other documents may be marked as deleted. If a new normalized media document was added then the mapping module may determine whether it matches any other normalized media documents, and if so, add appropriate mappings.

Figure 12:
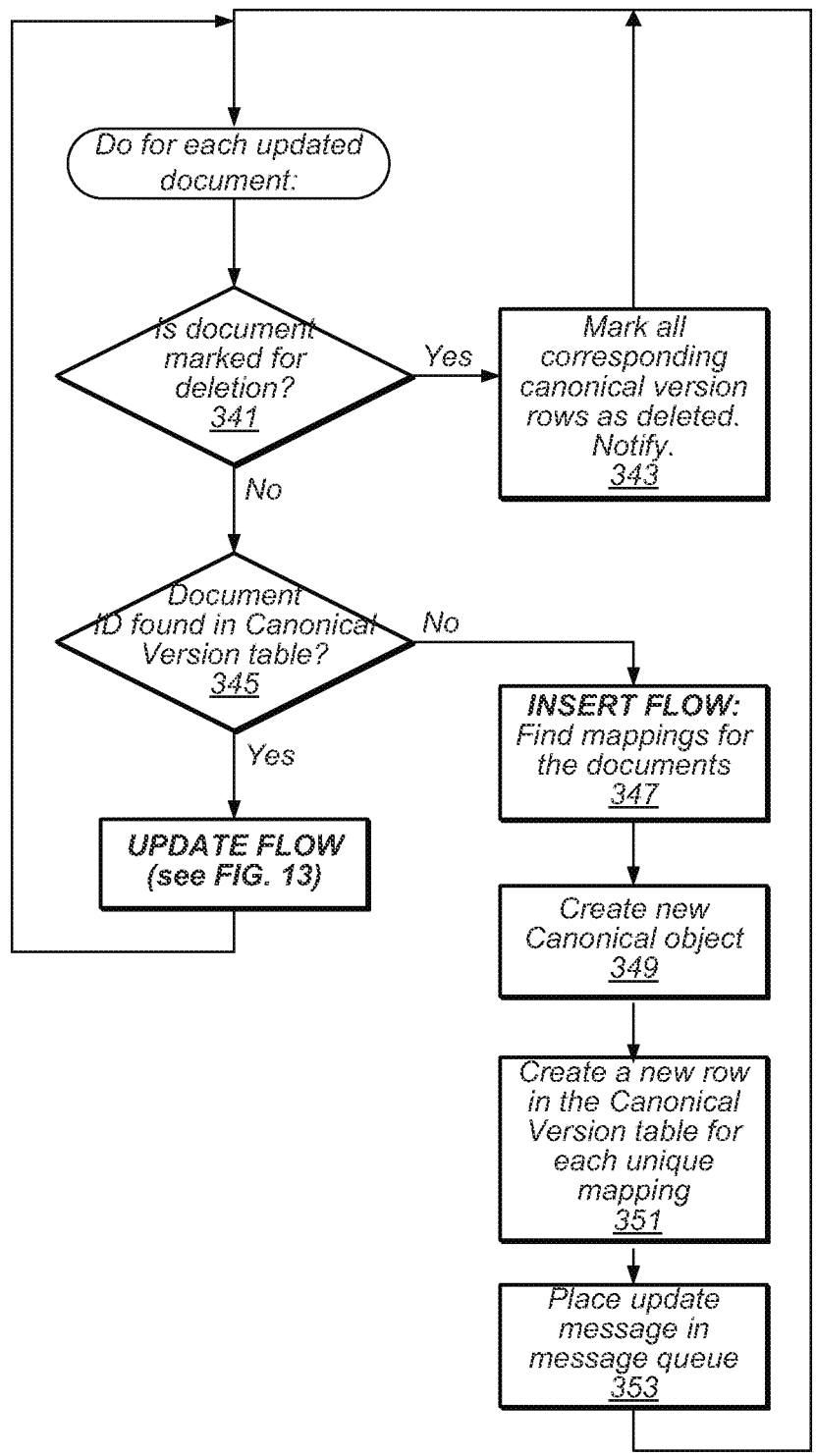
FIGS. 12 and 13 are flowchart diagrams illustrating one embodiment of a method for updating canonical objects after the media integration system has updated a set of normalized media documents and their mappings.

The canonical objects may also be updated in response to the update from the content provider system(s). FIG. 12 is a flowchart diagram illustrating one embodiment of a method for updating the canonical objects after the media integration system 100 has updated the normalized media documents and the mappings. For each normalized media document that was updated, the canonicalization module may determine whether the normalized media document was marked for deletion (block 341). If so then each row in the Canonical Version table that corresponds to the normalized media document may be marked as deleted (block 343). The canonicalization module may also add a notification message to the message queue to indicate that the canonical object(s) to which these rows correspond changed, e.g., so that the store indexer or other client modules can update their information.

If the normalized media document was not marked for deletion then the canonicalization module may query the database to determine whether any rows in the Canonical Version table correspond to this normalized media document, e.g., by checking the normalized media document ID specified in each row (block 345). If not then this indicates that the normalized media document is a new one that has been added to the system. In this case, the canonicalization module may look up the mappings for the normalized media document (block 347) and create a new canonical object, e.g., by adding a new row to the Canonical Object table, (block 349). The canonicalization module may then create a new row in the Canonical Version table for each unique mapping (block 351) and place an update message in the message queue (block 353) to indicate that the new canonical object has been created.

Figure 13:
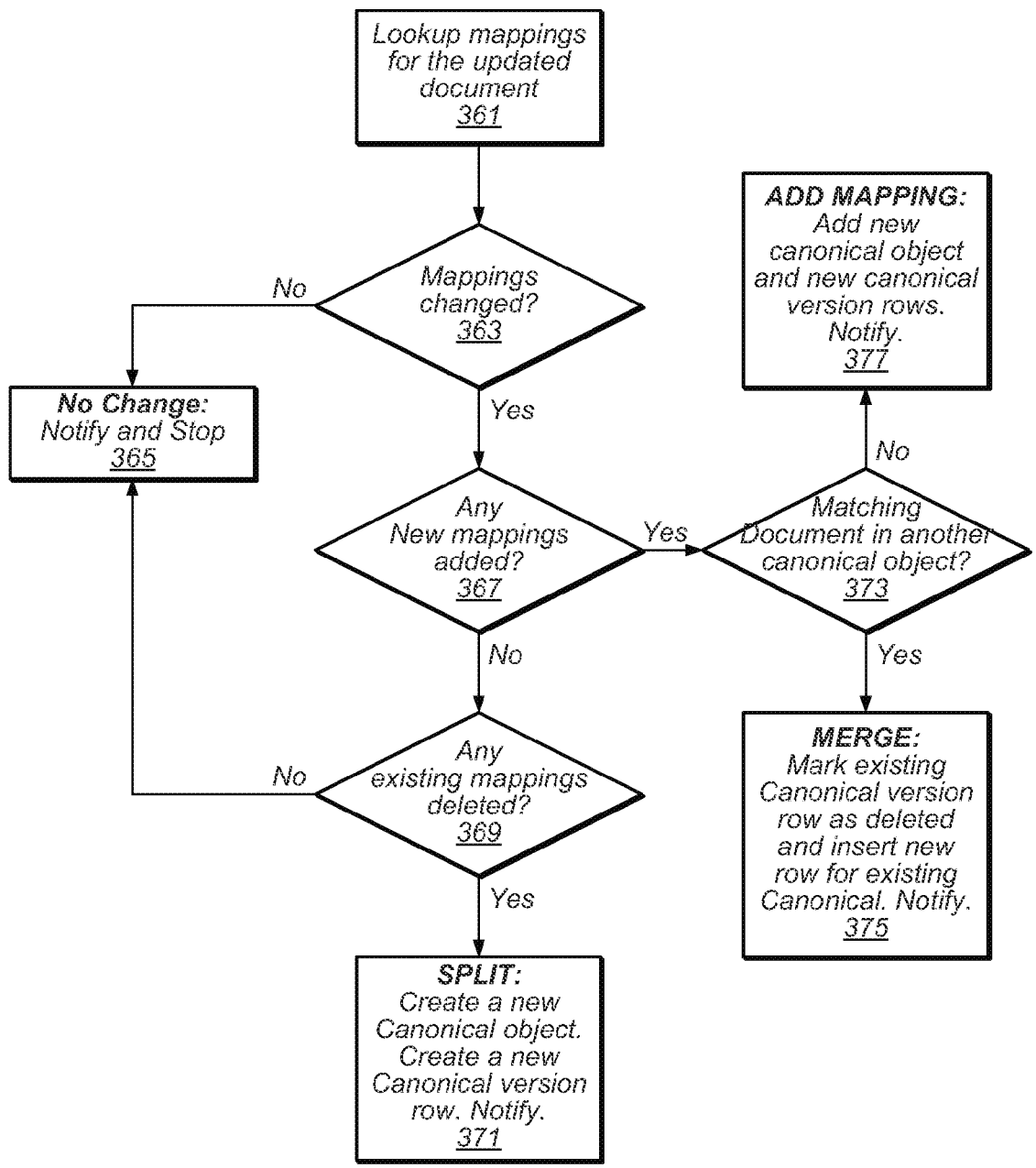

Referring again to block 345, if the canonicalization module determines that any rows in the Canonical Version table do correspond to the normalized media document then this indicates that the normalized media document already existed in the system and has been updated. In this case, an update flow may be performed, as shown in the flowchart of FIG. 13. As shown in FIG. 13, the canonicalization module may lookup the mappings for the updated normalized media document (block 361) and determine whether they have changed (block 363). If not then no change to the canonical objects is necessary, and so the canonicalization module may not perform any modifications. However, the canonicalization module may still place a message in the message queue indicating that the normalized media document was updated (block 365), e.g., so that the store indexer or other client modules can update their information to reflect the changes to the normalized media document if necessary.

If the mappings for the updated normalized media document have changed then the canonicalization module may determine whether any new mappings for the normalized media document were added (block 367). If not then the canonicalization module may then determine whether any of the previously existing mappings for the normalized media document were deleted (block 369). If no mappings were added or deleted then the flow again proceeds to block 365 since no change to the canonical object information is necessary. Otherwise if any of the previously existing mappings were deleted then the canonicalization module may perform a split operation by creating a new canonical object in the Canonical Object table and a new row in the Canonical Version table linking the updated normalized media document to the new canonical object (block 371). The canonicalization module may also remove the updated normalized media document from the previous canonical object it was included in. The canonicalization module may then place a message in the message queue to notify other modules of the new canonical object.

FIG. 14 illustrates an example of a split operation (block 371). In this example, there was previously a mapping 9003 between the normalized media documents having the IDs 2 and 3, but this mapping has now been marked as deleted. For example, the title for the normalized media document may have previously been "Finding Nemo" but may have been corrected to "Finding Nemon," thus causing the normalized media documents to no longer match each other. As a result, the third row in the Canonical Version table which previously linked the normalized media document having the ID 3 to the 5001 canonical object along with the other two normalized media documents has been marked as deleted. A new canonical object 5002 has been created, and a new row has been added to the Canonical Version table to indicate that the normalized media document having the ID 3 is included in the canonical object 5002.

Referring again to block 367, if the canonicalization module determines that a new mapping for the normalized media document was added then the flow may proceed to block 373 where the canonicalization module determines whether the other matching normalized media document specified by the mapping is already included in another canonical object. If so then the canonicalization module may merge the updated normalized media document into this canonical object by adding a new row to the Canonical Version table linking the normalized media document to the canonical object (block 375). The normalized media document may have previously been represented as a row in the Canonical Version table linking the normalized media document to another canonical object, and this row may be marked as deleted. The canonicalization module may also place one or more messages in the message queue to notify other modules of the changes to the canonical objects.

FIG. 15 illustrates an example of a merge operation (block 375). In this example, the normalized media document for the Titanic movie released in 1953 was previously included in the canonical object having the ID 5003, and this canonical object did not include any other normalized media documents. Subsequently, some change in this normalized media document for the 1953 Titanic movie (or some change in the algorithm used by the mapping module) caused the mapping module to determine that the normalized media document now matches the normalized media document having ID 4 (the 1997 Titanic movie from the CP-A content provider system). As a result, the updated normalized media document for the 1953 Titanic movie has been merged into the same canonical object 5002 as the normalized media document which it matches, as indicated by the last row in the Canonical Version table. Also, the previous row above it which linked the normalized media document for the 1953 Titanic movie to the canonical object 5003 has been marked as deleted. The canonicalization module may also add a reference pointer from the canonical object 5003 which is not used any more to the canonical object 5002 to indicate that the canonical object 5003 is superseded by the canonical object 5002. This may be useful for example, if other modules still use the ID of the canonical object 5003. If a client module attempts to lookup the canonical object 5003, the lookup request may be automatically redirected to the canonical object 5002, e.g., as opposed to returning an error.

Referring again to block 373, if the canonicalization module determines that the other matching normalized media document specified by the mapping is not already included in another canonical object then the flow may proceed to block 377, where the canonicalization module may add a new canonical object and add a respective row to the Canonical Version table to link the updated normalized media document and each of its matching documents to the new canonical object.

In some embodiments the media integration system 100 may include or may interface with a store indexer module 214. The store indexer may be configured to invoke various functions provided by the canonical API 206 in order to build one or more indices that use the groupings specified by the canonical objects. For example, the indices may be used by client devices to display a user interface in which different media productions from different content provider system are logically grouped as specified by the canonical objects.

Other client modules 213 may use the canonical API 206 to obtain information about the canonical objects and the media productions represented by the canonical objects for any of various other purposes. For example, in some embodiments the IDs of the canonical objects may serve as a standard reference that are used not only by the company or organization that implements the media integration system, but are also used by third party systems. For example, the media integration system may serve as an authoritative source that integrates information about the media productions available across a wide array of content provider systems. Thus, a client module may call the canonical API to perform operations such as obtaining a list of IDs of the canonical objects in the media integration system, obtaining a list of media productions represented by a particular canonical object ID, etc.

The canonical API may expose a set of functions or procedures that can be invoked or queried by a client module using any of various software interface techniques. For example, in some embodiments the canonical API may include a URL-based interface that enables a client module to perform various functions by referencing uniform resource locators (URLs) with particular parameters embedded in them. In other embodiments the canonical API may accept structured query language (SQL) queries or other queries to access the database of canonical objects. In other embodiments the canonical API may communicate with a client module using any of various other kinds of messaging or program invocation techniques.

Figure 16:
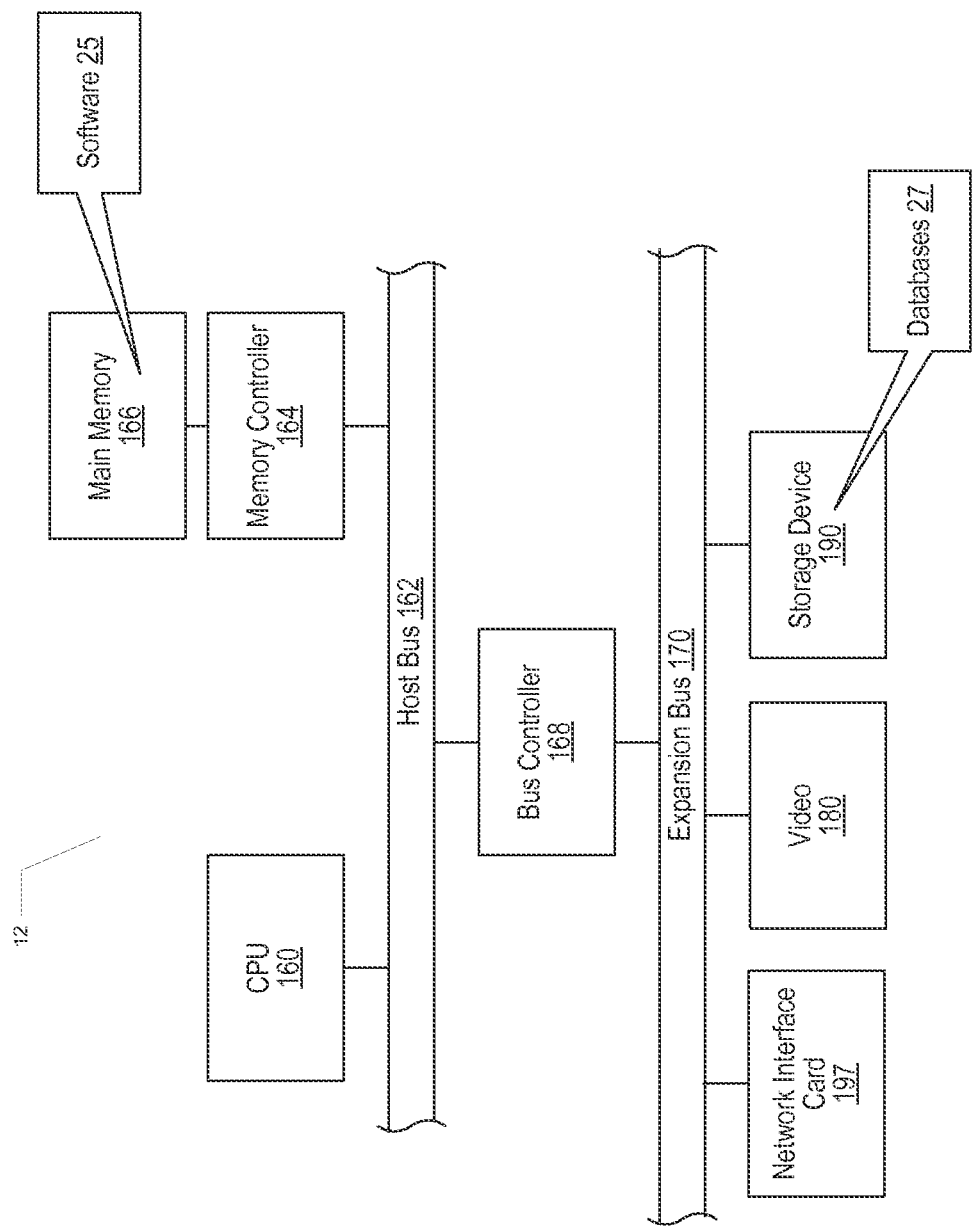
FIG. 16 illustrates one embodiment of a computer system which may be included in the media integration system.

The media integration system 100 may include one or more computing devices or servers which may implement the methods described above. FIG. 16 illustrates one embodiment of a computer system 12 which may be included in the media integration system 100. In various embodiments, the media integration system 100 may include any kind of computer system or computing device(s), such as one or more personal computer systems (PC), workstations, servers, network appliances, or other type of computing device or combinations of devices. In general, the term "computer system" can be broadly defined to encompass any device (or combination of devices) having at least one processor that executes instructions from one or more storage mediums. Although FIG. 16 illustrates a single computer 12, in some embodiments the functions of the media integration system 100 may be distributed across a plurality of computers that operate in conjunction with each other and communicate via one or more networks.

The computer system 12 of FIG. 16 may include at least one central processing unit or CPU (processor) 160 which is coupled to a processor or host bus 162. The CPU 190 may be any of various types. For example, in some embodiments, the processor 160 may be compatible with the x86 architecture, while in other embodiments the processor 160 may be compatible with the SPARC™ family of processors. Also, in some embodiments the storage server computer 150 may include multiple processors 160.

The computer system 12 may also include memory 166 in which program instructions implementing the software 25 are stored. The software 25 may implement the various software modules and tools, and their associated functionality described above, such as the import modules, normalization modules, mapping modules, canonicalization module, content management tool, store indexer, etc. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the computer system 12. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more storage devices 190. The storage device(s) 190 include any kind of device configured to store data, such as one or more disk drives, solid state drives, optical drives, tape drives, etc. In the illustrated example, the one or more storage devices are coupled to the computer system 12 via the expansion bus 170, but in other embodiments may be coupled in other ways, such as via a network interface card 197, through a storage area network (SAN), via a communication port, etc.

Information may be stored on the storage device(s) 160 by the software 25, such as files and/or one or more databases. The information stored on the storage device(s) 160 may include any of the various types of information discussed above, such as the media productions imported from the content provider systems, the normalized documents created from the media productions, the mappings created by the mapping module, the information created by the canonicalization module to represent the canonical objects, etc.

Figure 17:
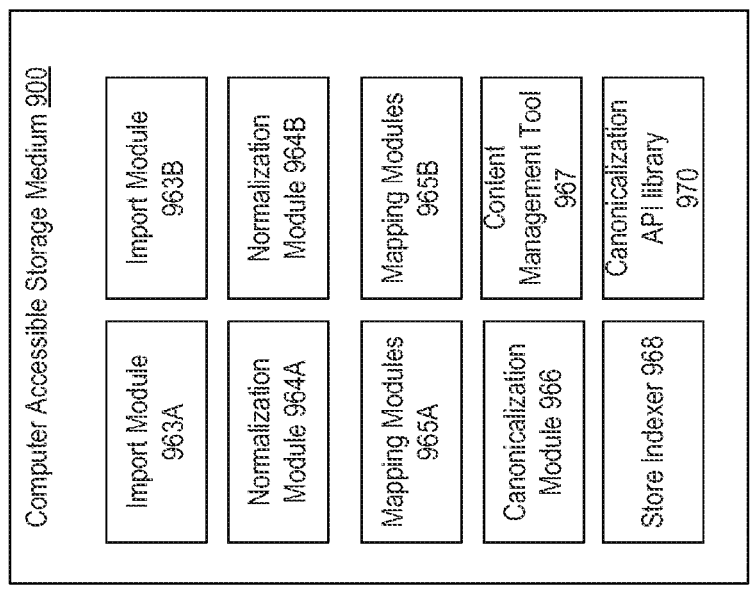
FIG. 17 illustrates a computer accessible storage medium storing program instructions that may be executed by the media integration system.

Turning now to FIG. 17, a block diagram of a computer accessible storage medium 900 is shown. The computer accessible storage medium 900 may store program instructions executable by one or more processors to implement various functions described above, such as program instructions associated with the media integration system 100. Generally, the computer accessible storage medium 900 may store any set of instructions which, when executed, implement a portion or all of the functions described herein. For example, the computer accessible storage medium 900 may include various import modules 963 and normalization modules 964 associated with different content provider systems and/or associated with different types of media productions, mapping modules 965 for the different types of media productions, a canonicalization module 966, a content management tool 967, a store indexer 968, a canonicalization library 970, etc.

Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
communicating with a plurality of content provider systems to import media productions from each content provider system;
creating a respective normalized media document representing each of the media productions that are imported;
identifying a potential match between at least three media productions, wherein at least two media productions of the three media productions are identified as instances of a same content provided by different content provider systems, and wherein at least one media production of the three media productions is identified as not being an instance of the at least two media productions, but is identified as being related to the at least two media productions;
maintaining a mapping table comprising a plurality of entries, wherein each entry is configured to identify a potential match between at least two media productions and a score that represents a level of confidence in said potential match;
creating a canonical object that corresponds to the at least three media productions, wherein the canonical object identifies each of the three media productions;
maintaining a canonical object table comprising a plurality of entries, wherein each entry is configured to identify a canonical object; and
maintaining a canonical version table configured to identify multiple instances of a media production.

2. The method of claim 1, further comprising maintaining a normalized media document table comprising a plurality of entries, wherein each entry is configured to identify a normalized media document created for a media production that has been imported.

3. The method of claim 2, wherein each normalized media document includes a last updated field that indicates when a corresponding media production was last updated.

4. The method of claim 3, wherein each normalized media document further includes a deleted field that indicates whether the corresponding media production has been deleted.

5. The method of claim 1, further comprising flagging a potential match to identify said potential match for later review, responsive to determining said score is low.

6. The method of claim 1, wherein a first media production of the at least three media productions is a first instance of a given movie, television program or video from a first content provider system, and wherein a second media production of the at least three media productions is a second instance of the movie, television program or video from a second content provider system that is different from the first content provider system.

7. The method of claim 6, wherein the at least two media productions are instances of a same movie and the at least one media production is one of a movie trailer or a movie review.

8. The method of claim 1, further comprising creating an index based on the canonical object, wherein the index is useable by a client device to display a user interface in which the at least three matching media productions are displayed together.

9. The method of claim 1, further comprising:
storing information in association with the canonical object to override one or more information fields specified in the media productions linked together by the given canonical object.

10. The method as recited in claim 1, wherein the canonical version table comprises a plurality of entries, and wherein each entry of the canonical version table is configured to identify a canonical object identified in the canonical object table.

11. A system comprising:
one or more storage devices; and
one or more computer servers, wherein the one or more computer servers are configured to execute:
a plurality of import modules, wherein each import module is executable to communicate with a particular content provider system to import a set of media productions from the content provider system onto the one or more storage devices; and
one or more mapping modules executable to:
identify a potential match between at least three media productions, wherein at least two media productions of the three media productions are identified as instances of a same content provided by different content provider systems, and wherein at least one media production of the three media productions is identified as not being an instance of the at least two media productions, but is identified as being related to the at least two media productions;
maintain a mapping table comprising a plurality of entries, wherein each entry is configured to identify a potential match between at least two media productions and a score that represents a level of confidence in said potential match;
create a canonical object that corresponds to the at least three media productions, wherein the canonical object identifies each of the three media productions;
maintain a canonical object table comprising a plurality of entries, wherein each entry is configured to identify a canonical object; and
maintain a canonical version table configured to identify multiple instances of a media production.

12. The system as recited in claim 11, wherein the canonical version table comprises a plurality of entries, and wherein each entry of the canonical version table is configured to identify a canonical object identified in the canonical object table.

13. A non-transitory computer-accessible storage medium storing program instructions executable by one or more processors to:
communicate with a plurality of content provider systems to import a set of media productions from each content provider system;
create a respective normalized media document representing each of the media productions that are imported; and
identify a potential match between at least three media productions, wherein at least two media productions of the three media productions are identified as instances of a same content provided by different content provider systems, and wherein at least one media production of the three media productions is identified as not being an instance of the at least two media productions, but is identified as being related to the at least two media productions;

maintain a mapping table comprising a plurality of entries, wherein each entry is configured to identify a potential match between at least two media productions and a score that represents a level of confidence in said potential match;

create a canonical object that corresponds to the at least three media productions, wherein the canonical object identifies each of the three media productions;

maintain a canonical object table comprising a plurality of entries, wherein each entry is configured to identify a canonical object; and maintain a canonical version table configured to identify multiple instances of a media production.

14. The non-transitory computer-accessible storage medium of claim 13, wherein a first media production of the at least three media productions is a first instance of a given movie, television program or video from a first content provider system, and wherein a second media production of the at least three media productions is a second instance of the movie, television program or video from a second content provider system that is different from the first content provider system.

15. The non-transitory computer-accessible storage medium of claim 13, wherein the canonical version table comprises a plurality of entries, and wherein each entry of the canonical version table is configured to identify a canonical object identified in the canonical object table.

16. A method comprising:
communicating with a plurality of content provider systems to import a set of media productions from a plurality of content provider systems;

identifying a potential match between at least three media productions, wherein at least two media productions of the three media productions are identified as instances of a same content provided by different content provider systems, and wherein at least one media production of the three media productions is identified as not being an instance of the at least two media productions, but is identified as being related to the at least two media productions;

maintaining a mapping table comprising a plurality of entries, wherein each entry is configured to identify a potential match between at least two media productions and a score that represents a level of confidence in said potential match;

creating a canonical object that corresponds to the at least three media productions, wherein the canonical object identifies each of the three media productions;

maintaining a canonical object table comprising a plurality of entries, wherein each entry is configured to identify a canonical object; and maintaining a canonical version table configured to identify multiple instances of a media production.

17. The method as recited in claim 16, wherein the canonical version table comprises a plurality of entries, and wherein each entry of the canonical version table is configured to identify a canonical object identified in the canonical object table.

18. A system comprising:
an interface configured to communicate with a plurality of content provider systems to import a set of media productions from each content provider system; and a processor configured to:
create a respective normalized media document representing each of the media productions that are imported;

identify a potential match between at least three media productions, wherein at least two media productions of the three media productions are identified as instances of a same content, and wherein at least one media production of the three media productions is identified as not being an instance of the at least two media productions provided by different content provider systems, but is identified as being related to the at least two media productions;

maintain a mapping table comprising a plurality of entries, wherein each entry is configured to identify a potential match between at least two media productions and a score that represents a level of confidence in said potential match;

create a canonical object that corresponds to the at least three media productions, wherein the canonical object identifies each of the three media productions;

maintain a canonical object table comprising a plurality of entries, wherein each entry is configured to identify a canonical object; and maintain a canonical version table configured to identify multiple instances of a media production.

19. The system of claim 18,
maintain a normalized document table comprising a plurality of entries, wherein each entry is configured to identify a normalized media document.

20. The system of claim 18, wherein the processor is further configured to flag a potential match to identify said potential match for later review, responsive to determining said score is low.

21. The system of claim 18, wherein a first media production of the at least three media productions is a first instance of a given movie, television program or video from a first content provider system, and wherein a second media production of the at least three media productions is a second instance of the movie, television program or video from a second content provider system that is different from the first content provider system.

22. The system of claim 18, wherein the processor is further configured to store a respective canonical object for each of the one or more media productions, wherein the canonical object for each respective media production of the one or more media productions includes the respective media production.

23. The system as recited in claim 18, wherein the canonical version table comprises a plurality of entries, and wherein each entry of the canonical version table is configured to identify a canonical object identified in the canonical object table.

* * * * *